(12) United States Patent
Lee

(10) Patent No.: US 9,127,581 B2
(45) Date of Patent: Sep. 8, 2015

(54) FILTER ASSEMBLY AND EXHAUST GAS REDUCING DEVICE INCLUDING SAME

(75) Inventor: Heon Ju Lee, Jeju-do (KR)

(73) Assignee: Jeju National University Industry-Academic Cooperation Foundation (KR)

( * ) Notice: Subject to any disclaimer, the term of this patent is extended or adjusted under 35 U.S.C. 154(b) by 488 days.

(21) Appl. No.: 13/509,188

(22) PCT Filed: Nov. 10, 2010

(86) PCT No.: PCT/KR2010/007924
§ 371 (c)(1),
(2), (4) Date: Sep. 21, 2012

(87) PCT Pub. No.: WO2011/059233
PCT Pub. Date: May 19, 2011

(65) Prior Publication Data
US 2013/0014494 A1    Jan. 17, 2013

(30) Foreign Application Priority Data

Nov. 10, 2009  (KR) .................. 10-2009-0107826
Nov. 17, 2009  (KR) .................. 10-2009-0110810

(51) Int. Cl.
*F01N 3/02*  (2006.01)
*F01N 3/027*  (2006.01)
(Continued)

(52) U.S. Cl.
CPC ............ *F01N 3/027* (2013.01); *B01D 46/2418* (2013.01); *B01D 46/4245* (2013.01); *B01D 46/4263* (2013.01); *B01D 46/448* (2013.01);
(Continued)

(58) Field of Classification Search
CPC ........... B01D 46/2418; B01D 46/4245; B01D 46/4263; B01D 46/448; F01N 9/002; F01N 3/0253; F01N 3/031; F01N 3/027
USPC .......................................................... 60/311
See application file for complete search history.

(56) References Cited

U.S. PATENT DOCUMENTS 4,573,317 A * 3/1986 Ludecke ..................... 60/303
4,650,576 A * 3/1987 Leary et al. ................ 210/184
(Continued)

FOREIGN PATENT DOCUMENTS

JP    1984-002414    1/1984
JP    11984-002414   1/1984
(Continued)

OTHER PUBLICATIONS

English translation of Korean Patent Application Publication No. KR 10-2008-0081943A (Sep. 10, 2008).*
(Continued)

*Primary Examiner* — Jason Shanske
(74) *Attorney, Agent, or Firm* — Swanson & Bratschun, L.L.C.

(57) ABSTRACT

A filter assembly includes: a cylindrical diesel particulate filter disposed on a flow passage through which an exhaust gas from an engine is discharged, the filter having gas flow passages formed and disposed therein by dividing an inner space into a lattice form; and an electrode unit disposed at at least one of both side surfaces of the filter, the electrode unit receiving electric power to heat the filter. A plurality of regions resulting from division into a lattice form in the filter have alternately disposed open and closed sections. A device for reducing an exhaust gas including the above filter assembly is also provided.

23 Claims, 13 Drawing Sheets

(51) Int. Cl.
*B01D 46/24* (2006.01)
*B01D 46/42* (2006.01)
*B01D 46/44* (2006.01)
*F01N 9/00* (2006.01)
*F01N 3/025* (2006.01)
*F01N 3/031* (2006.01)

(52) U.S. Cl.
CPC ............... *F01N 3/0253* (2013.01); *F01N 3/031* (2013.01); *F01N 9/002* (2013.01); *B01D 2279/30* (2013.01); *F01N 2410/03* (2013.01); *F01N 2900/1602* (2013.01); *Y02T 10/47* (2013.01)

(56) References Cited

U.S. PATENT DOCUMENTS

| | | | | |
|---|---|---|---|---|
| 4,910,959 | A * | 3/1990 | Dones | 60/280 |
| 5,013,340 | A * | 5/1991 | Taslim et al. | 55/290 |
| 5,582,002 | A * | 12/1996 | Pattas | 60/274 |
| 5,916,133 | A * | 6/1999 | Buhrmaster et al. | 60/297 |
| 7,171,801 | B2 * | 2/2007 | Verkiel et al. | 60/297 |
| 2005/0053534 | A1 * | 3/2005 | Liu et al. | 423/212 |
| 2005/0274104 | A1 * | 12/2005 | Bromberg et al. | 60/275 |
| 2008/0314032 | A1 * | 12/2008 | Li et al. | 60/297 |

FOREIGN PATENT DOCUMENTS

| | | |
|---|---|---|
| JP | 1988-036617 | 3/1988 |
| JP | 11988-036617 | 3/1988 |
| JP | 1994-226109 | 8/1994 |
| JP | 07-102943 | 4/1995 |
| JP | 07-279647 | 10/1995 |
| JP | 08-042325 | 2/1996 |
| JP | 2002-309922 | 10/2002 |
| JP | 2003-172128 | 6/2003 |
| JP | 2004-108255 | 4/2004 |
| JP | 2004-261664 | 9/2004 |
| JP | 2004-270690 | 9/2004 |
| JP | 06-515395 | 5/2006 |
| JP | 2006-183602 | 7/2006 |
| JP | 2008-232101 | 10/2008 |
| KR | 10-0565024 | 3/2006 |
| KR | 10-2008-0081943 | 9/2008 |

OTHER PUBLICATIONS

International Search Report mailed Jul. 29, 2011 for International Application No. PCT/KR2010/007924.

* cited by examiner

V - V

FILTER ASSEMBLY AND EXHAUST GAS REDUCING DEVICE INCLUDING SAME

CROSS-REFERENCE TO RELATED APPLICATION

This application is a 35 U.S.C. §371 national phase application of PCT/KR2010/007924 (WO 2011/059233), filed on Nov. 10, 2010, entitled "Filter Assembly and Exhaust Gas Reducing Device Including Same", which application claims priorities to and the benefits of Korean Patent Application No. 2009-0107826, filed on Nov. 10, 2009 and Korean Patent Application No. 2009-0110810, filed on Nov. 17, 2009, the disclosures of which are incorporated herein by reference in their entirety.

BACKGROUND

1. Field of the Invention

The present invention relates to a filter assembly and a device for reducing an exhaust gas including the same. More particularly, the present invention relates to a filter assembly including an electrode unit having an improved structure for preventing obstruction of flow of the exhaust gas introduced into a filter, and a device for reducing an exhaust gas including the same.

2. Discussion of Related Art

Compared to a gasoline engine, a diesel engine has advantages in terms of fuel-efficiency and output. Unlike the gasoline engine, however, the diesel engine discharges harmful substances such as particulate matter (PM) in its exhaust gas.

Since such particulate matter has been recognized as a major form of air pollution, many countries have tightened their regulations on the discharge such harmful substances.

In order to satisfy the regulations of every country on the discharge of harmful substances such as particulate matter, technologies for reducing harmful substances have been developed. As technology for reducing harmful substances such as particulate matter, a diesel particulate filter is mounted on an exhaust gas flow passage between the diesel engine and a muffler to capture particulate matter.

Here, the filter captures particulate matter discharged together with the exhaust gas. As a method of recycling particulate matter captured by the filter, the filter is directly heated to burn particulate matter captured on the filter.

For example, an electrical heater or a diesel burner is installed between the engine and the filter, and a temperature of the exhaust gas is increased up to a temperature at which particulate matter captured in the filter can be burned. In order to heat directly the filter, an electrode unit to which electric power is applied to is connected to the filter.

However, installation of the electrical heater or the diesel burner between the engine and the filter reduces productivity. Accordingly, as another method, an electrode unit is directly connected to at least one surface of the filter. By the electrode unit connected directly to one surface of the filter as above, the filter is heated so that particulate matter captured in the filter can be burned.

Here, the problem with the filter utilizing the electrode unit is that some regions of the filter are blocked by a shape of the electrode unit.

On the other hand, the above conventional method for directly heating the filter is disadvantageous in that the filter is cooled by a low-temperature exhaust gas flowing into it so that an excessive amount of energy is consumed to heat the filter. In addition, since the conventional filter has one capturing region, a lift of the filter is shortened due to overheating or super-cooling of the heater.

SUMMARY OF THE INVENTION

The present invention provides a filter assembly including an electrode unit having an improved structure to ensure air-permeability of the electrode unit and a filter for an exhaust gas, and a device for reducing an exhaust gas including the above filer assembly.

The present invention also provides a filter assembly in which an inner space of a filter is divided into a plurality of capturing regions and an electrode unit corresponds to the filter to enhance a capturing efficiency of the filter, and a device for reducing an exhaust gas including the above filter assembly The present invention also provides a filter assembly including an electrode unit which does not disturb a flow of exhaust gas discharged from a diesel engine and containing particulate matter, in order to increase particulate matter burning efficiency, and a device for reducing an exhaust gas including the above filter assembly.

The present invention also provides an exhaust gas reducing device having an improved structure to prevent a low-temperature exhaust gas from flowing into a filter constituting a filter assembly and cooling the filter.

The present invention also provides an exhaust gas reducing device in which a filter constituting a filter assembly has a plurality of capturing regions to enhance capturing performance of the filter and to prevent over-heating of the filter.

The present invention provides a filter assembly including: a cylindrical diesel particulate filter disposed on a flow passage through which an exhaust gas from an engine is discharged, having gas flow passages formed by dividing an inner space into a lattice form, and configured to capture particulate matters contained in the exhaust gas in the gas flow passages; and an electrode unit disposed at at least one of both side surfaces of the filter, the electrode unit receiving electric power to heat the filter; wherein a plurality of regions resulting from division into a lattice form in the filter have alternately disposed open and closed sections.

Here, the electrode unit may have a lattice shape to allow the gas flow passages of the filter to communicate with the electrode unit.

The lattice-shaped electrode unit may correspond to the lattice-shaped filter and have alternately disposed open sections and closed sections, and the open section of the filter may communicate with the open section of the electrode unit.

In addition, the filter assembly of the present invention may further include a flow passage dividing part for dividing an inner space of the filter into at least two capturing regions in which particulate matters are captured.

The flow passage dividing part may be formed of an insulator for insulating the capturing regions from each other.

Here, a plurality of electrode units may be provided, and the electrode units may correspond to at least two or more capturing regions.

The electrode unit may have a pin provided therein and inserted into the closed section of the filter to increase an electrical contact between the electrode unit and the filter.

In addition, the electrode unit may be oriented parallel to a flow direction of the exhaust gas passing through the filter, and preferably be disposed horizontally, to avoid interrupting flow of the exhaust gas.

Also, the electrode unit may have at least one lead wire attached to the closed section of the filter.

The filter may be formed of a ceramic material containing silicon carbide (SiC).

Furthermore, the present invention provides a device for reducing an exhaust gas that includes: a filter assembly having at least two capturing regions formed therein; a flow passage dividing part disposed at at least one of both side surfaces of the filter assembly, the flow passage dividing part having communicating sections of the exhaust gas formed therein and corresponding to at least two or more capturing regions; at least one opening/closing member disposed on the flow passage dividing part and reciprocated between an opening location at which the communicating section is opened and a closing location at which the communicating section is closed; and a driving unit configured to provide the opening/closing member with a driving force for allowing the communicating sections to be opened and closed selectively by the opening/closing member.

The device for reducing an exhaust gas may further include: a power supply configured to supply electric power to the filter assembly; a plurality of electrode units provided in the capturing regions to apply electric power from the power supply to the at least two capturing regions and configured to heat the capturing regions of the filter assembly; a temperature sensing unit provided in the filter assembly to sense a temperature of the filter; and a control unit configured to control the driving unit, which provides the opening/closing member with a driving force, on the basis of the temperature of the filter sensed by the temperature sensing unit, to allow the communication sections to be opened and closed selectively by the opening/closing member.

In addition, the driving unit may include a motor configured to generate a driving force; and a drive shaft disposed between the motor and the opening/closing member to transmit the driving force from the motor to the opening/closing member.

The communicating sections may be disposed radially at regular angular intervals about a center of the flow passage dividing part.

The communicating sections may have the same area in the flow passage dividing part.

The flow passage dividing part may include a first flow passage dividing part having a plurality of first communicating sections formed therein by uniformly dividing the flow passage dividing part radially; and a second flow passage dividing part having a smaller area than the first flow passage dividing part, concentrically arranged with respect to the first flow passage dividing part, and having a plurality of second communicating sections formed therein by uniformly dividing the flow passage dividing part radially.

Further, an axial line of the drive shaft may be extended along a center of the flow passage dividing part, and the opening/closing member may be connected to the drive shaft and rotated reciprocally between the opening location and the closing location of the communicating sections.

The device for reducing an exhaust gas of the present invention may further include a gas supply unit provided between the engine and the opening/closing member, the gas supply unit being connected to the opening/closing member and rotated according to the rotation of the opening/closing member, and having feeding passages formed therein for a combustion gas, an oxidizing agent, or a reducing agent to be supplied into the filter.

The plurality of drive shafts and the opening/closing members may be provided to open and close the communicating sections having the same area using a flap method.

The axial line of the drive shaft may be extended along a center of the flow passage dividing part. In addition, the opening/closing member may include a first opening/closing member connected to the drive shaft and rotated reciprocally to allow the first communicating section to be opened and closed, and a second opening/closing member connected to the drive shaft and rotated reciprocally to allow the second communicating section to be opened and closed.

The flow passage dividing parts and the opening/closing members may be disposed at both side surfaces of the filter, and the control unit may control the driving unit to allow the opening/closing members disposed at both side surfaces of the filter to be operated according to the driving unit for opening and closing the communicating sections.

The detailed structures of example embodiments are illustrated in the accompanying drawings and described in the detailed description.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
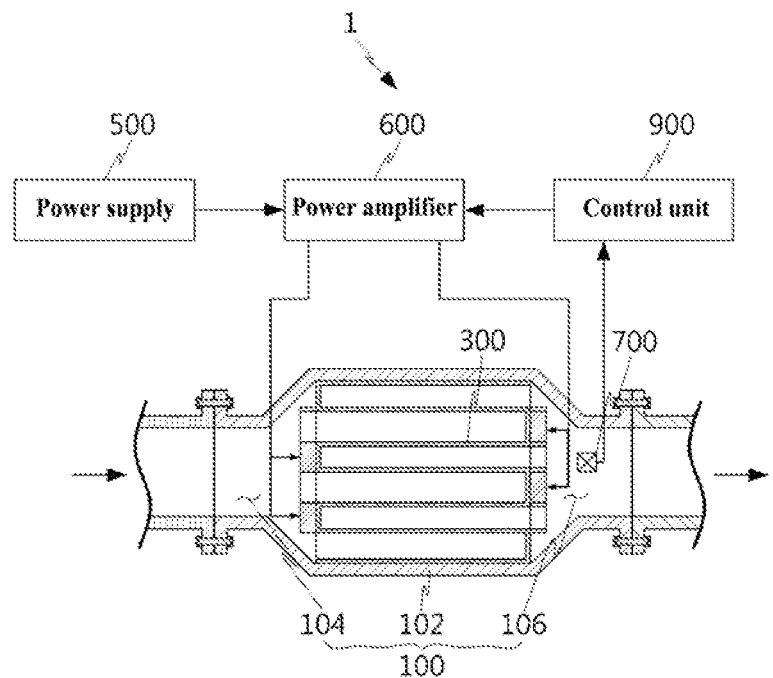
FIG. 1 is a schematic sectional view of a device for reducing an exhaust gas according to the present invention.
Figure 2:
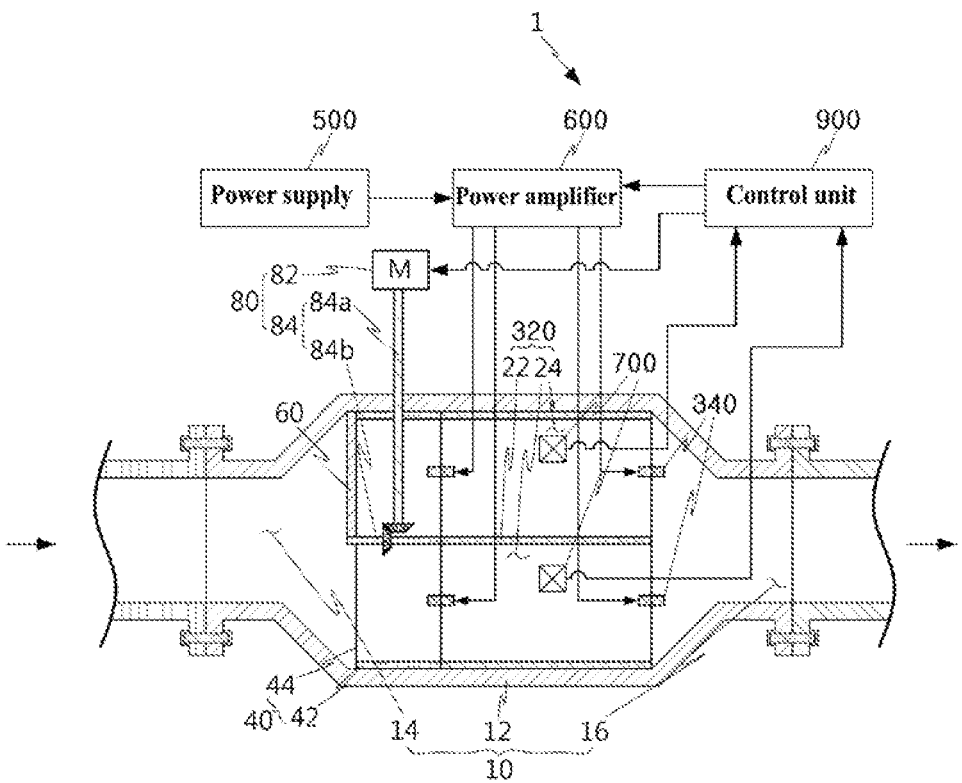
FIG. 2 is another schematic sectional view of a device for reducing an exhaust gas according to the present invention.
Figure 3:
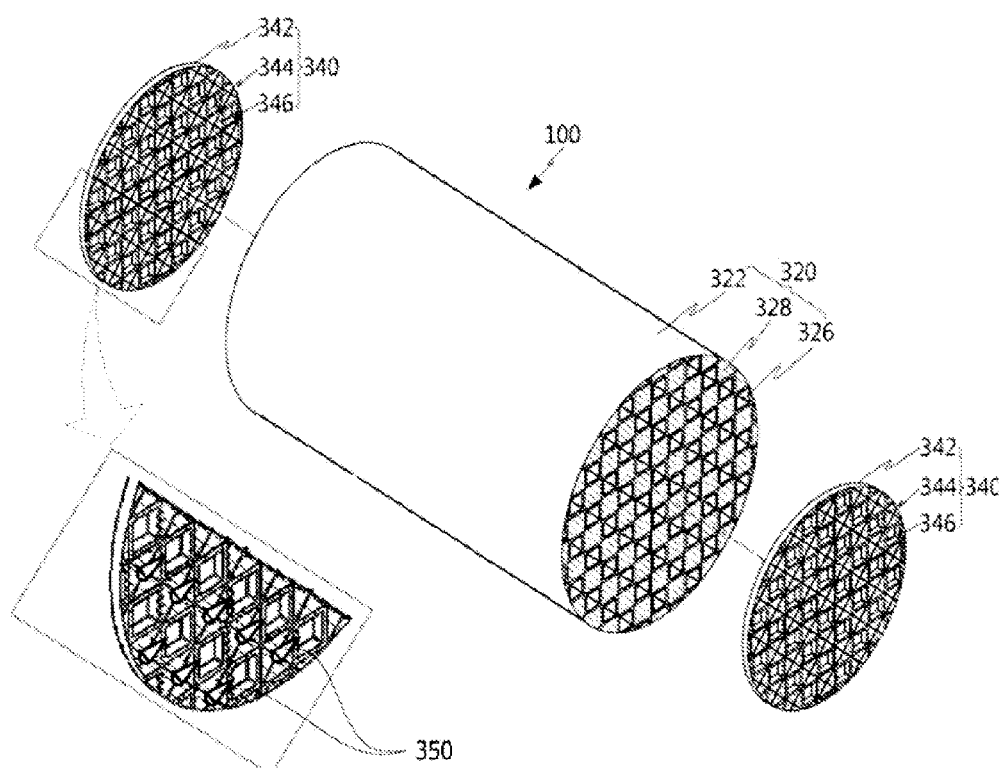
FIG. 3 is an exploded perspective view of a filter assembly according to the present invention.
Figure 4:
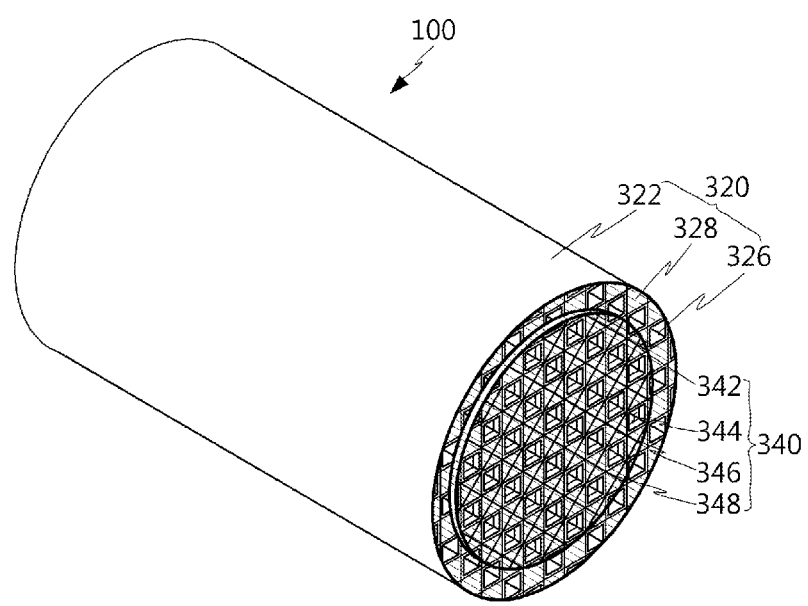
FIG. 4 is a combined perspective view of a filter assembly according to the present invention.
Figure 5:
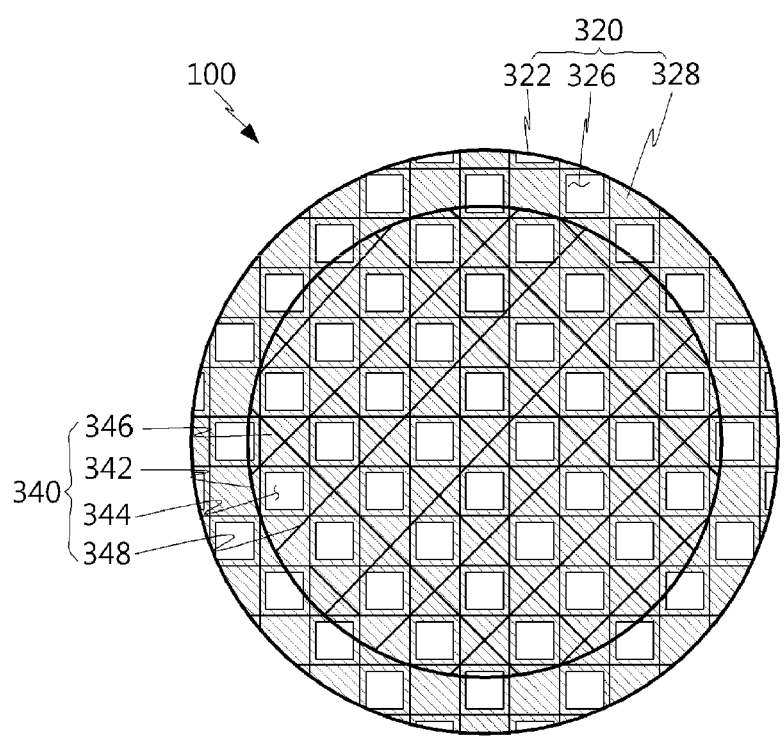
FIG. 5 is a side view of a filter assembly according to the present invention.
Figure 6:
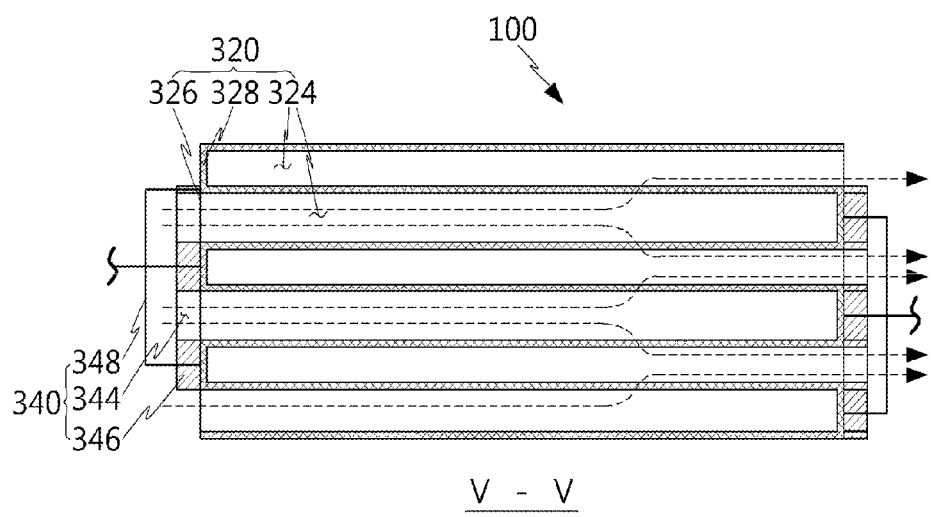
FIG. 6 is a sectional view of a filter assembly according to the present invention.
Figure 7:
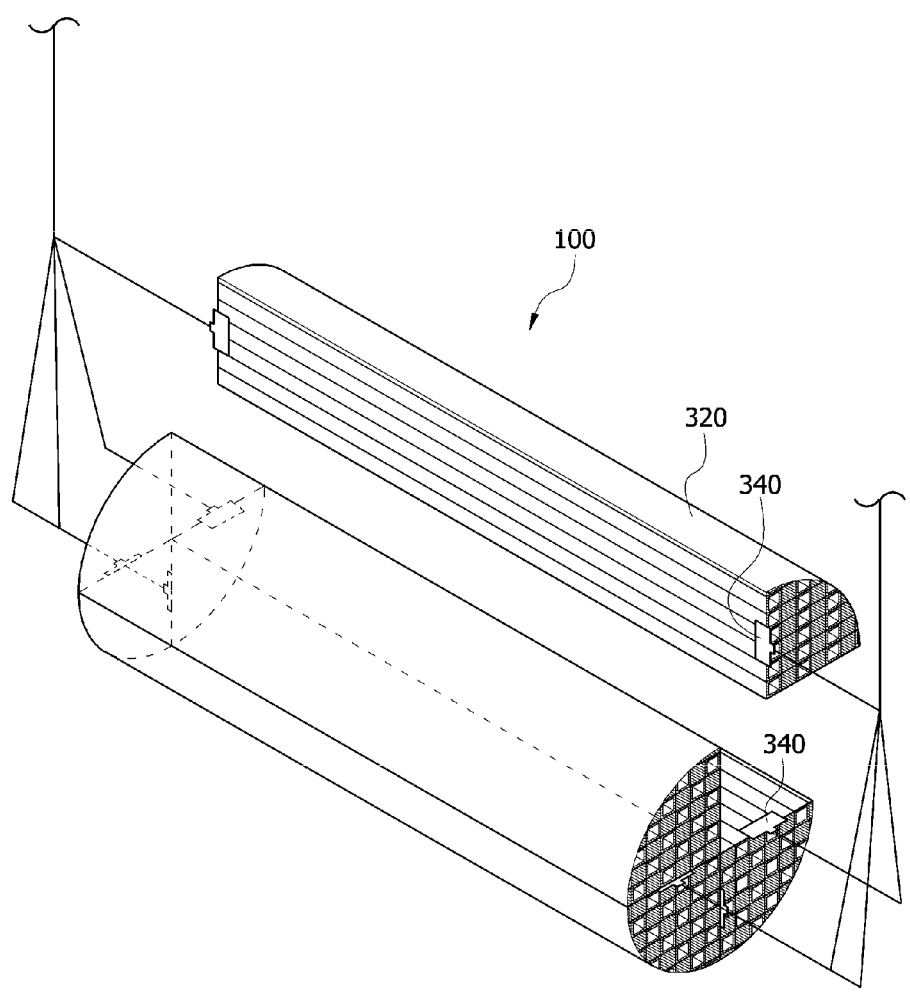
FIG. 7 is a perspective view of a filter assembly according to the present invention having another configuration.
Figure 8:
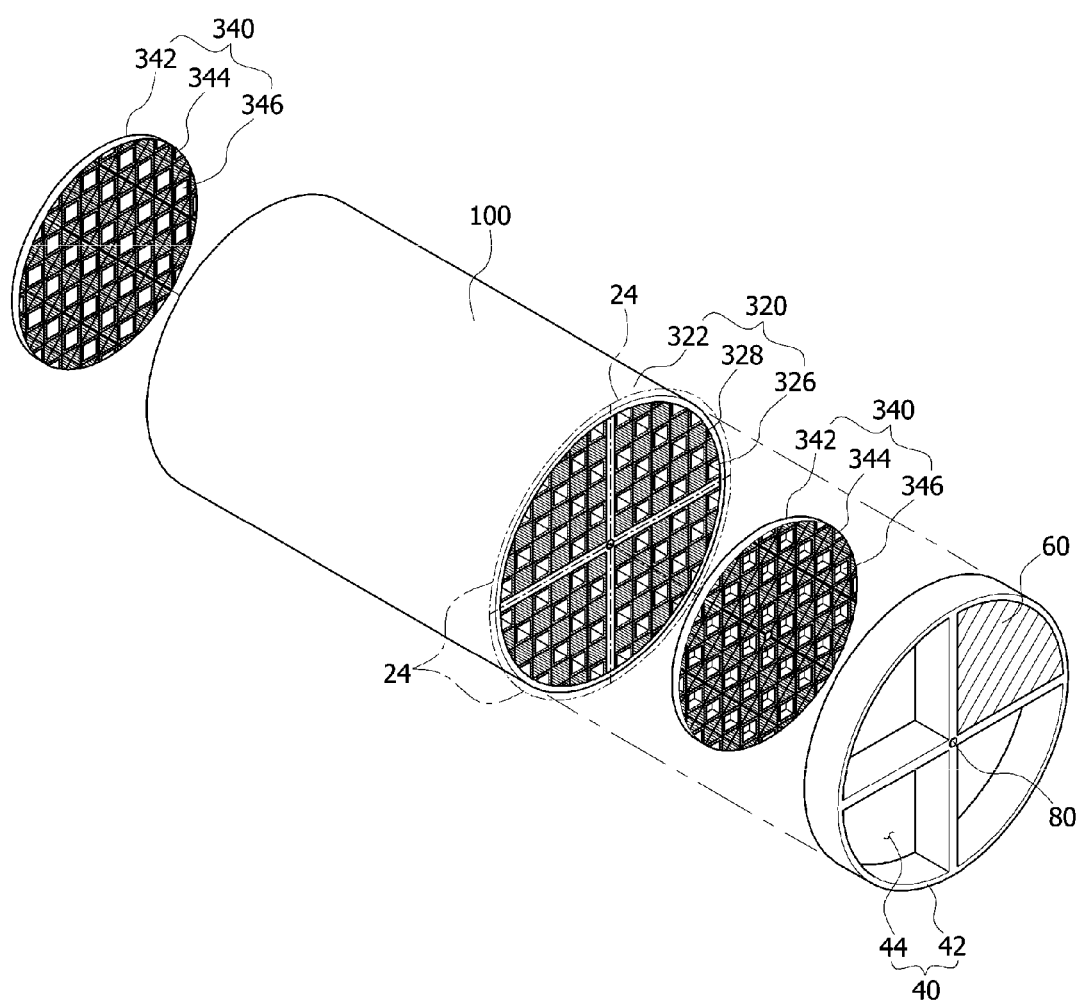
FIG. 8 is another side of a filter assembly according to the present invention.
Figure 9:
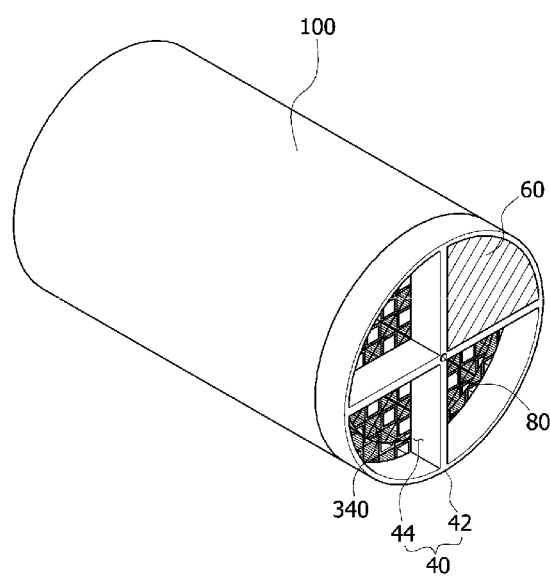
FIG. 9 is an exploded perspective view of a flow passage dividing part and a filter assembly to which an opening/closing member of a device for reducing an exhaust gas according to the present invention are mounted.
Figure 10:
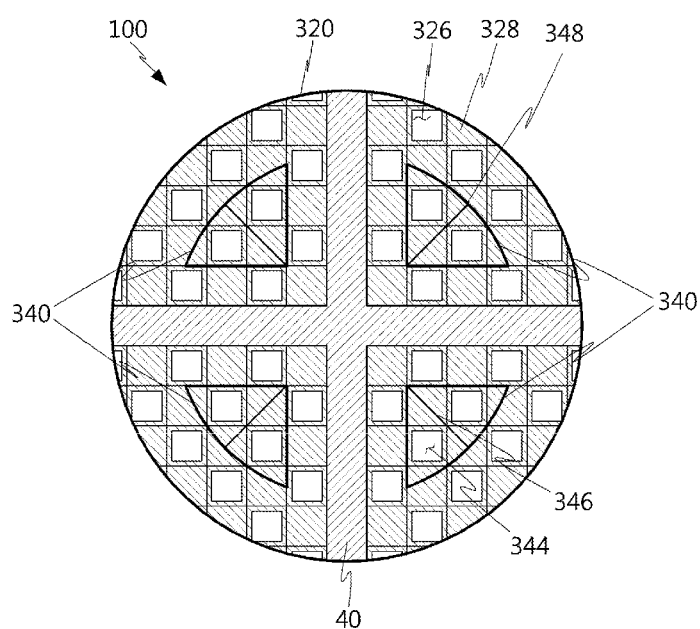
FIG. 10 is a combined perspective view of a flow passage dividing part and a filter assembly to which an opening/closing member of a device for reducing an exhaust gas according to the present invention are mounted.

Hereinafter, example configurations of the present invention will be described in detail.

The features and advantages of the present invention, the structure for achieving the above, and a method of driving the present invention will be best understood with reference to the embodiments described below and illustrated in the accompanying drawings.

As a preferable embodiment of the present invention, a device for reducing an exhaust gas that is mounted to a vehicle will be described below. However, the present invention can be applied to other machines such as ships and the like that utilize diesel engines.

As shown in FIG. 1 to FIG. 14, a device 1 for reducing an exhaust gas according to the present invention includes a housing 100, a filter assembly 300, a flow-passage dividing part 40, an opening/closing member 60, a driving unit 80, a power supply 500, an electrode unit 340, a temperature sensing unit 700 and a control unit 900.

The housing 100 includes a housing body 102, an inlet 104 and an outlet 106. Basically, the housing body 102 accommodates the filter assembly 300, the flow passage dividing part 40 and the opening/closing member 60. In view of a flow resistance of an exhaust gas flowing in the housing body 102, the housing body has a cylindrical shape. Of course the housing boy 102 may have various other shapes such as a rectangular pipe shape.

The inlet 104 is formed between a diesel engine (not shown) and the filter assembly 300 to guide an exhaust gas discharged from the diesel engine to the filter assembly 300. And, the outlet 106 is formed between the filter assembly 300 and a muffler (not shown) to guide the exhaust gas passing through the filter assembly 300 to the muffler.

Here, the inlet 104 and the outlet 106 are formed on both sides of the housing body 102 in the lengthwise direction of the housing body 102. As only one embodiment of the present invention, however, the inlet 104 and the outlet 106 are formed in the lengthwise direction of the housing body 102. It goes without saying that the inlet 104 and the outlet 106 may be formed in a direction which is perpendicular to the lengthwise direction of the housing body 102.

The filter assembly 300 according to the present invention includes a filter 320 and the electrode unit 340. The filter assembly 30 has a function of capturing particulate matters contained in the exhaust gas discharged from the engine.

The filter 320 is provided on a flow passage through which the exhaust gas produced in the engine is discharged, and is a cylindrical diesel particulate filter capable of capturing particulate matters contained in the exhaust gas. In addition, the filter 320 includes a filter body 320, gas flow passages 324, open sections 326 and closed sections 328.

The filter 320 is formed of a ceramic material containing silicon carbide (SiC).

The filter body 322 forms the appearance of the filter 320.

The gas flow passages 324 through which the exhaust gas flows are formed in the filter body 322, and particulate matters contained in the exhaust gas flowing through the gas flow passages 324 are captured by the filter body 322.

An inner space of the filter body 322 is divided into the plurality of gas flow passages 324 and looks like a lattice in cross-section. In other words, the plurality of gas flow passages 324 are formed in the filter body 322, and the number of the flow passages is the same as that of the divided regions divided in the lattices shape. Harmful substances passing through the gas flow passages 324 are captured by partition walls that divide the inner space of the filter body 322 into the plurality of gas flow passages 324.

The open sections 326 and the closed sections 328 are alternately disposed at end portions of the plurality of lattice-shaped divided regions of the filter body 322. In other words, the open sections 326 and the closed sections 328 are formed such that each open section 326 (or closed section) is adjacent to one or more the closed sections 328 (or open sections). The open sections 326 and the closed sections 328 open and close each of the gas flow passages 324.

The open section 326 and the closed section 328 are disposed at respective ends of each gas flow passage 324 formed in the filter body 322. In other words, the open section 326 is formed at one end of the gas flow passage 324 and the closed section 328 is formed at the other end of the gas flow passage 324. By forming the open section 326 and the closed section 328 at respective ends of each gas flow passage 324, an exhaust gas introduced into one flow passage via the open section 326 flows into the adjacent gas flow passage through the porous partition wall, particulate matters are captured when the exhaust gas passes through the partition wall to the open section of the adjacent gas flow passage 324.

As one specific aspect, the inner space of the filter body 322 according to the present invention may be divided into two (2) or more capturing regions 24 by the partition walls.

As another specific aspect, the inner space of the filter body 322 according to the present invention may be divided into four (4) capturing regions 24 by the partition walls. In other words, capturing regions 24 of the filter body 322 may be divided into four (4) capturing regions 24 by orthogonal partition walls. The above capturing regions 24 of the filter body 322 act as the flow passages through which the exhaust gas flows and a capturing means by which particulate matters contained in the exhaust gas are captured.

The flow-passage dividing part 40 according to the present invention includes a dividing body 42 and a communicating section 44.

The flow-passage dividing part 40 is disposed at one end of the filter assembly 300, adjacent to the inlet 14.

The dividing body 42 has a shape corresponding to the shape of the filter assembly 300.

The dividing body 42 has a cylindrical shape corresponding to the cylindrical shape of the filter assembly 300.

In addition, the dividing body 42 is coupled to one end surface of the filter assembly 300. And, an interior of the dividing body 42 is divided by the partition walls to form the communicating section 44 communicating with the capturing region 24 of the filter assembly 300.

The communicating section 44 is divided into a plurality of communicating sections by the partition wall disposed in the dividing body 42.

Two (2) or more communicating sections 44 in the present invention are formed so as to allow the communicating sections to correspond to the capturing regions 24 of the filter assembly 300, respectively.

At this time, as one example, if the filter assembly 300 includes four (4) capturing regions 24 formed therein, four (4) communicating sections 44 are formed in the dividing body 42 respectively corresponding to the four (4) capturing regions 24. Each communicating section 44 communicates with the corresponding capturing region 24 of the filter assembly 300 to ensure permeability of the filter assembly to the exhaust gas. In other words, the interior of the dividing body 42 is divided uniformly and radially about a center of the flow-passage dividing part 40 to form the communicating sections 44.

Next, the opening/closing member 60 is disposed at the flow-passage dividing part 40 and reciprocated between an opening location at which the communicating sections 44 are opened and a closing location at which the communicating sections 44 are closed.

One opening/closing member 60 is disposed at the flow-passage dividing part 40.

The opening/closing member 60 is connected to the driving unit 80 to selectively open or close the communicating sections 44 by means of a driving force transmitted from the driving unit 80.

In addition, the opening/closing member 60 is connected to a drive shaft 84 extended in the radial direction of the flow-passage dividing part 40 and is reciprocally rotated between the opening location and the closing location.

For example, the opening/closing member 60 is operated to selectively open and close four (4) communicating sections 44. In other words, if one communicating section 44 is closed by the opening/closing member 60, the remaining (three) communicating sections 44 are open. The opening/closing member 60 is rotated by a driving force transmitted from the driving unit 42 in the radial direction, which is perpendicular to the lengthwise direction of the dividing body 42.

In addition, two (2) opening/closing members 60 may be provided in the flow-passage dividing part 40. At this time, it is preferable that two opening/closing members 60 are opposed to each other to avoid mutual interference.

The driving unit 80 of the present invention includes a motor 82 and the drive shaft 84.

The driving unit 80 provides the opening/closing member 60 with a driving force to allow the communicating sections 44 to be selectively opened and closed by the opening/closing member 60.

The motor 82 is provided for generating a driving force.

A conventional DC motor or AC motor may be utilized as the motor 82. As the motor 82 in one embodiment of the present invention, however, a stepping motor capable of adjusting a rotational angle of the drive shaft 84 may be utilized.

The drive shaft 84 includes a first drive shaft 84a and a second drive shaft 84b.

The first drive shaft 84a is connected to the motor 82 and rotated by a driving force transmitted from the motor 82. And, the second drive shaft 84b is connected to the opening/closing member 60 to transmit a driving force to the opening/closing member 60. Here, the first drive shaft 84a and the second drive shaft 84b are coupled to each other via conventional bevel gears. Of course, the motor 82 and the drive shaft 84 are disposed in the flow-passage dividing part 40 to enable the drive shaft 84 to be directly connected to the opening/closing member 60. As described above, various known transmission systems can be employed for supplying a driving force of the driving unit 80 to the opening/closing member 60.

The electrode unit 340 according to the present invention is disposed on at least one of both side surfaces of the filter 320 and has the lattice shape to allow the gas flow passages 324 to communicate with the electrode unit. The electrode unit 340 receives electric power from the power supply 500 to heat the filter 320. Here, two electrode units 340 are disposed at respective side surfaces of the filter 320.

The electrode unit 340 includes a body 342, open sections 344, closed sections 346 and lead wires 348.

The body 342 forms an appearance of the electrode unit 340 and has a circular plate shape corresponding to a sectional shape of the cylindrical filter 320.

The body 342 of the electrode unit 340 is in contact with the filter to heat the filter 320. Since the filter 320 is heated by the electric power supplied to the body 342 of the electrode unit 340, harmful substances captured in the filter 320 are burned.

In the body 342 of the electrode unit 340, the open sections 344 and closed sections 346 are alternately disposed in a lattice form. Here, the open sections 344 communicate with the open sections 326 of the filter 320. Since the open sections 344 of the body 342 of the electrode unit 340 communicate with the open sections 326 of the filter 320, the exhaust gas to be introduced into the filter 320 can flow into the gas flow passage 324 by the body 342 of the electrode unit 340 without flow resistance.

A pin 350 which is inserted into the closed section of the filter 320 may be provided in the electrode unit 340 to increase an electrical contact between the electrode unit and the filter 320.

Although the electrode unit 340 of the present invention has a smaller sectional area than the filter 320 and is disposed on an end surface of the filter 320, a dimension of the electrode unit 340 may be modified in view of an amount of heat supplied to the filter 320. In addition, the electrode unit 340 may have a rectangular sectional shape which differs from a sectional shape of the filter 320. At this time, the open sections 344 of the body 342 of the electrode unit 340 should communicate with the open sections 326 of the filter 320.

In the present invention, as one specific aspect, four (4) electrode units 340 corresponding to four (4) capturing regions 24 may be provided and disposed at each of the filters 320 constituting the filter assembly 300. The shape of the electrode unit 340 corresponds to the shape of the filter 320 which is divided into the capturing regions 24. However, the electrode unit 340 may have a different shape than the filter 320, such as a circular shape, and the same sectional area as the filter 320.

In the present invention, as another specific aspect, if four (4) electrode units 340 are provided and arranged at the filters 320, respectively, the electrode unit 340 is connected to each filter 320 such that the electrode unit 340 is oriented parallel to a flow direction of the exhaust gas passing through the filter 320. Preferably, the electrode unit 340 is disposed horizontally so as not to interrupt flow of the exhaust gas passing through the filter 320.

At this time, the electrode unit 340 connected to each filter 320 may be embedded in the filter 320 or may be attached to an outer surface of the filter 320.

The lead wire 348 electrically connects the body 342 of the electrode unit 340 to the power supply 500. The lead wire 348 transmits electric power generated in the power supply 500 to the body 342 of the electrode unit 340 to enable the filter 320 to be heated by the body 342 of the electrode unit 340.

The lead wire 348 is provided adjacent to the closed section 346 of the filter 320 so as not to interrupt a flow of the exhaust gas. If a high current is supplied to the electrode unit, a plurality of lead wires 348 may be provided.

Here, if four (4) electrode units are provided for four (4) capturing regions 24 and connected to four (4) capturing regions 24, respectively, a plurality of temperature sensing units 700 may be provided for sensing a temperature of each capturing region 24.

In addition, two (2) electrode units 340 may be connected to both sides of the filter 320, respectively, i.e., to each capturing region 24. However, only one electrode unit 340 may be connected to each capturing region 24. The electrode unit 340 connected to each capturing region 24 heats only the corresponding capturing region 24. Of course, it is preferable that the housing body acts as the partition walls for insulating each capturing region 24.

The power supply 500 according to the present invention consists of a battery generating a voltage of 12 V or 24 V. The power supply 500 is electrically connected to the electrode unit 340 to supply electric power to the electrode unit 340.

On the other hand, the device 1 for reducing an exhaust gas further includes a power amplifier 600 for amplifying electric power generated in the power supply 500 and supplying it to the electrode unit 340.

Here, a process for heating the filter by means of the power supply 500, the electrode unit 340 and the power amplifier 600 is as described below. Since the resistance of the filter 320 is inversely proportional to a temperature of the filter 320, which is increased by the supply of electric power from the power supply 500, it is efficient to increase a voltage as the temperature of the filter 320 drops and to lower the voltage as the temperature of the filter 320 rises.

At this time, the gain of the power amplifier 600 may be adjusted. In this case, the gain of the power amplifier 600 may be adjusted by the control unit 900, and a conduction time may be adjusted by frequency modulation.

The temperature sensing unit 700 senses a temperature of the filter assembly 300, and in particular, a temperature of the filter 320 constituting the filter assembly. 300.

A signal corresponding to a temperature sensed by the temperature sensing unit 700 is transmitted to the control unit 900.

The temperature sensing units 700 according to the present invention may correspond to a plurality of capturing regions 24 to sense a temperature of each capturing region 24 of the filter 320. The signal carrying information sensed by the temperature sensing unit 700 disposed at each capturing region 24 is sent to the control unit 900, which controls operation of the opening/closing member 60 on the basis of the above sensing signal.

Of course, control of operation of the opening/closing member 60 is interrelated with control of operation of the driving unit 80. The control unit 900 according to the present invention controls operation of the driving unit 80 providing the opening/closing member 60 with the driving force on the basis of the sensing signal of the temperature sensing units 700 to enable the communicating sections 44 to be opened and closed selectively by the opening/closing member 60. For example, if the control unit 900 determines that a temperature indicated by the sensing signal transmitted from the temperature sensing units 700 disposed at one of the plurality of capturing regions 24 is less than a prescribed temperature, the control unit 900 controls operation of the opening/closing member 60 to close the communicating section 44 of the corresponding capturing region 24. The above control of operation of the opening/closing member 60 is performed by control of operation of the driving unit 80 by the control unit 900.

Figure 11:
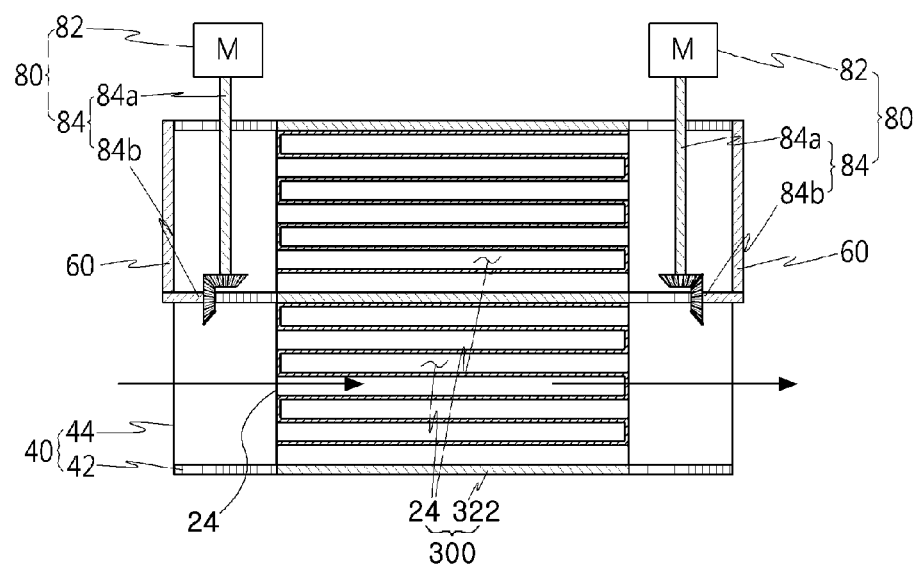
FIG. 11 is a schematic sectional view showing that a flow passage dividing part and an opening/closing member are disposed on both side surfaces of a filter assembly of a device for reducing an exhaust gas according to the present invention.

As shown in FIG. 11, the flow passage dividing parts 40 are disposed at both side surfaces of the filter 320. Of course, two (2) opening/closing members 60 are provided and correspond to two (2) flow passage dividing parts 40. The control unit 900 controls the operations of two (2) opening/closing members 60 to allow two (2) opening/closing members 60 to open and close simultaneously the communicating sections 44 of flow passage dividing parts 40 provided at both sides of the filter 320.

For example, when one capturing region 24 is closed, the communicating sections 44 adjacent to both side surfaces of the capturing region 24 are closed by two (2) opening/closing members 60 to prevent the exhaust gas from flowing backward. When the exhaust gas passes through the filter 320, the communicating sections 44 adjacent to both sides of the capturing region 24 are opened to make a flow path for the exhaust gas.

Figure 12:
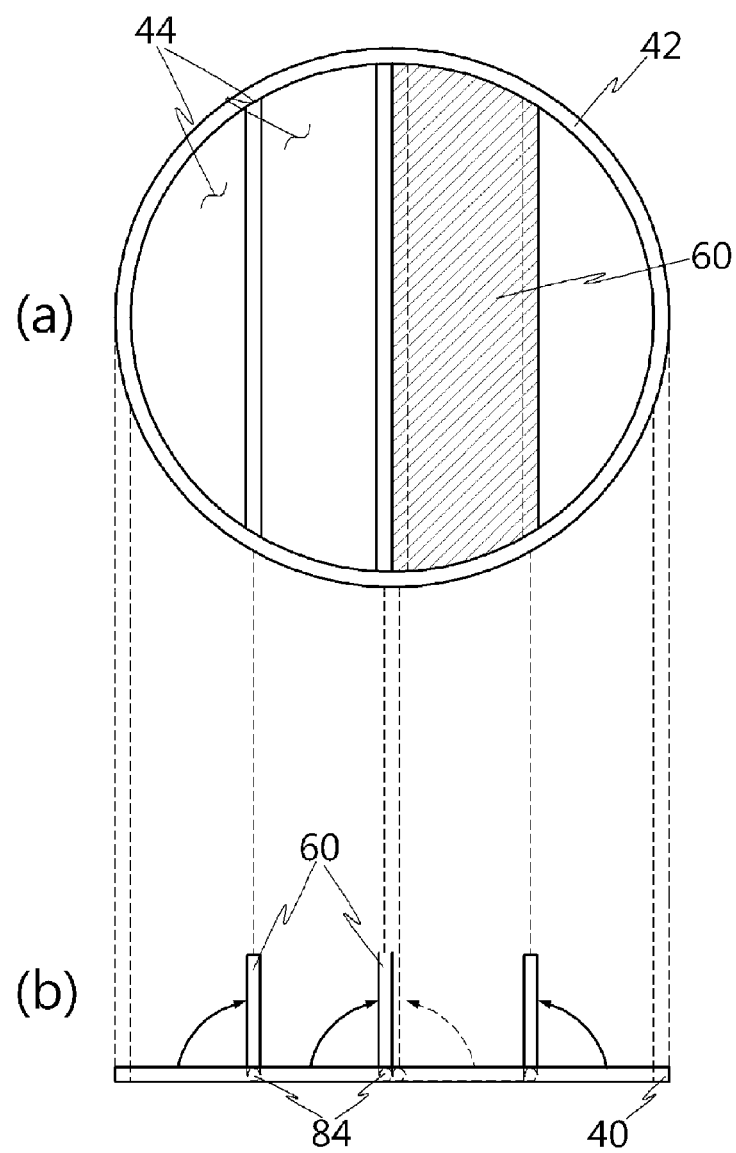
FIG. 12 is a view illustrating an operation state of a flow passage dividing part and an opening/closing member of a device for reducing an exhaust gas according to the present invention.

FIG. 12 is a view illustrating an operation state of the flow passage dividing part and the opening/closing member of the device for reducing an exhaust gas according to the present invention.

(a) in FIG. 12 is a front view of the flow passage dividing part 40. A plurality of communication sections 44 are formed in the flow passage dividing part 40 and the communication sections 44 all have the same area. (b) in FIG. 12 is a top view of the flow passage dividing part 40. A plurality of opening/closing members 60 are disposed for opening/closing respective communication sections 44.

Here, the plurality of opening/closing members 60 open and close the plurality of communication sections 44 using a flap method. Each of the above flap type opening/closing members 60 is connected to the drive shaft 84 to open and close a corresponding communication section 44 according to a control of the control unit 900. Four (4) opening/closing members 60 may open and/or close three (3) communication sections 44 according to control of the control unit 900. Various combinations of the opening/closing operations of the opening/closing members 60 may be performed by various combinations of control by the control unit.

Figure 13:
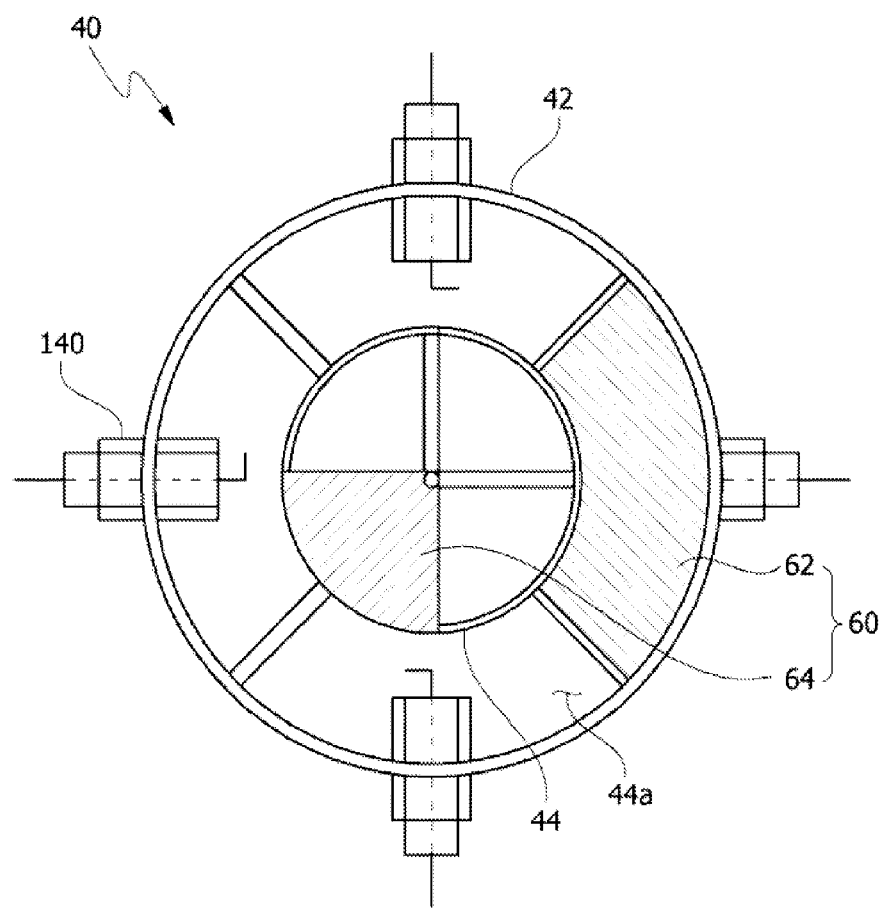
FIG. 13 is a front view illustrating another operation state of a flow passage dividing part and an opening/closing member of a device for reducing an exhaust gas according to the present invention.

Next, FIG. 13 is a front view illustrating an operation state of the flow passage dividing part and the opening/closing members of the device for reducing an exhaust gas according to the present invention.

As shown in FIG. 13, the flow passage dividing part 40 of the device 1 for reducing an exhaust gas according to the present invention includes a first flow passage dividing part 42 and a second flow passage dividing part 44. In addition, each opening/closing member 60 of the device 1 for reducing an exhaust gas according to the present invention includes a first opening/closing member 62 and a second opening/closing member 64.

The first flow passage dividing part 42 has a plurality of first communicating sections 42a formed therein by uniformly dividing the first flow passage dividing part 42 radially. As one embodiment, the first flow passage dividing part 42 is divided into four (4) first communicating sections 42a by partition walls.

The second flow passage dividing part 44 has a smaller area than the first flow passage dividing part 42, and the first flow passage dividing part 42 and the second flow passage dividing part 44 are concentrically arranged. The second flow passage dividing part 44 has a plurality of second communicating sections 44a formed therein by uniformly dividing the second flow passage dividing part 44 radially. The second flow passage dividing part 44 is divided into four (4) second communicating sections 44a by partition walls.

Of course the capturing region 24 of the filter 320 may be divided doubly into two sections corresponding to the first communication section 42a and the second communication section 44a formed in the first flow passage dividing part 42 and the second flow passage dividing part 44, respectively.

The opening/closing member 60 includes the first opening/closing member 62 for opening/closing the first communication section 42a of the first flow passage dividing part 42 and the second opening/closing member 64 for opening/closing the second communication section 44a of the second flow passage dividing part 44. Here, the first opening/closing member 62 and the second opening/closing member 64 are independently and reciprocally rotated.

The first opening/closing member 62 and the second opening/closing member 64 are reciprocally rotated by the drive shaft 84 extending in the radial direction of the first flow passage dividing part 42 and the second flow passage dividing part 44.

The first opening/closing member 62 and the second opening/closing member 64 are connected to the same drive shaft 84, which consists of two shafts to enable the first opening/closing member 62 and the second opening/closing member 64 to be independently and reciprocally rotated according to engagement and disengagement.

The device 1 for reducing an exhaust gas according to the present invention is advantageous in that the capturing region 24 of the filter 320 constituting the filter assembly 300 is subdivided twice so that it is possible to prevent a low-temperature exhaust gas from being introduced into each capturing region 24.

Figure 14:
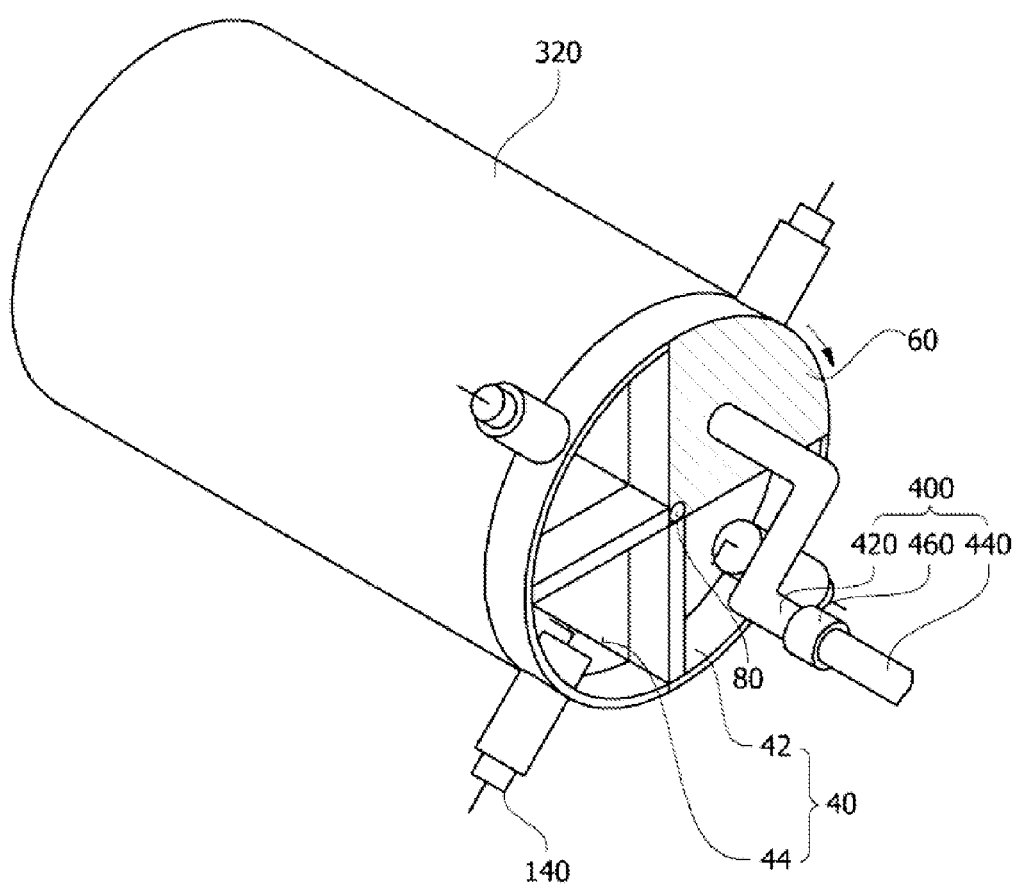
FIG. 14 is a perspective view of an opening/closing member, a flow passage dividing part, a filter assembly and a gas-supply unit of a device for reducing an exhaust gas according to the present invention.

Finally, FIG. 14 is a perspective view of the opening/closing member, the flow passage dividing part, the filter, and the gas-supply unit of the device for reducing an exhaust gas according to the present invention.

As shown in FIG. 14, the device 1 for reducing an exhaust gas according to the present invention includes the housing 100, the filter 320, the flow-passage dividing part 40, the opening/closing member 60, the driving unit 80, the power supply 500, the electrode unit 340, the temperature sensing unit 700, the control unit 900 and a gas supply unit 400.

Here, the housing 100, the filter 320, the flow-passage dividing part 40, the opening/closing member 60, the driving unit 80, the power supply 500, the electrode unit 340, the temperature sensing unit 700 and the control unit 900 are substantially the same as in the device for reducing an exhaust gas described above. Therefore, a detailed description of these elements is omitted here.

The gas supply unit 400 is provided between the engine and the opening/closing member 60 and is connected to the opening/closing member 60, so that the gas supply unit 400 can be rotated by rotation of the opening/closing member 60. Feeding passages for a combustion gas, an oxidizing agent or a reducing agent to be supplied into the filter 320 are formed in the gas supply unit 400. The gas supply unit 400 includes a gas supply pipe 420, a feed pipe 440 and a rotational coupling part 460.

The gas supply pipe 420 is connected to and communicates with the opening/closing member 60.

The gas supply pipe 420 is connected to the opening/closing member 60, with the gas supply pipe being disposed eccentrically with respect to a rotational axis of the rotational coupling part 460. The gas supply pipe 420 is rotated by rotation of the opening/closing member 60, and forms a flow passage through which the combustion gas, oxidizing agent or reducing agent fed from the feed pipe 440 is introduced into the filter 230.

The feed pipe 440 communicates with the engine to allow the combustion gas from the engine, and the oxidizing agent, the fuel and air, or the reducing agent to be guided into the filter 320. The combustion gas, oxidizing agent or reducing agent introduced into the feed pipe 440 is guided into the gas supply pipe 420 and then supplied into the filter 320.

The rotational coupling part 460 is disposed between the gas supply pipe 420 and the feed pipe 440. The rotational coupling part 460 is connected to the gas supply pipe 420 to allow the gas supply pipe 420 to be operated by rotation of the opening/closing member 60. Here, the gas supply pipe 420 is disposed eccentrically with respect to the rotational coupling part 460 and is rotated. The rotational coupling part 460 can be connected to the gas supply pipe 420 via various coupling means such as a rotatable joint and the like. The opening/closing member 60 may comprise an ignition device for initiating combustion when fuel and air is supplied.

Hence, on at least one of both side surfaces of the filter 320 where a plurality of capturing regions 24 are formed, the flow passage dividing part 40, in which a plurality of communicating sections 44 corresponding to a plurality of capturing regions 24 are formed, is disposed, and the opening/closing member 60 capable of selectively opening/closing a plurality of communicating sections 44 is mounted, and so it is possible to prevent the low-temperature exhaust gas from being introduced into each capturing region, thereby reducing the amount of energy required to heat the filter.

In addition, by making an atmosphere required for a reduction process, it is possible to effectively perform a reduction process for nitrogen oxide stored on the storage-reduction catalyst. Also, by feeding a high-temperature exhaust gas or an oxidizing agent through the gas supply unit 400, the filter can be easily recycled.

If an exhaust gas is required for recycling of the filter, some of the exhaust gas can be passed through the gas supply unit to promote oxidation. To this end, one or more communicating openings whose total area is 1 to 25% of the area of the opening/closing member can be formed on the opening/closing member 60.

In the filter assembly of the present invention, the open section of the filter and the open section of the electrode unit communicate with each other to ensure air-permeability of the filter assembly so that pressure loss and lowering of efficiency can be prevented, thereby enhancing product reliability.

In addition, in the filter assembly of the present invention, the open sections and the closed sections are alternately formed on both side surfaces of the filter to prevent an exhaust gas discharged from the filter from flowing backward and re-entering the filter, so that the filter can be recycled effectively.

Also, in the present invention, the electrode is provided such that the flow of exhaust gas is not interrupted, so that particulate matter burning efficiency can be enhanced.

In the device for reducing an exhaust gas according to the present invention, on at least one of both side surfaces of the filter assembly in which a plurality of capturing regions are formed, the flow passage dividing part on which a plurality of communicating sections corresponding to the plurality of capturing regions are formed is disposed, and the opening/closing member capable of selectively opening/closing the plurality of communicating sections is mounted, and so it is possible to prevent the low-temperature exhaust gas from being introduced into each capturing region, thereby reducing the amount of energy required to heat the filer.

In addition, the present invention is advantageous in that, by blocking an exhaust gas containing a large quantity of oxygen, a reduction atmosphere for a storage-reduction catalyst can be easily created to effectively perform a reduction reaction.

The effects of the present invention are not limited to those mentioned above, and those of ordinary skill in the art will be able infer other effects that can be achieved by the invention defined in the appended claims.

While the invention has been shown and described with reference to certain exemplary embodiments thereof, it will be understood by those skilled in the art that various changes in form and details may be made therein without departing from the scope of the invention as defined by the appended claims and their equivalents.

What is claimed is:

1. A device for reducing an exhaust gas, comprising: a filter assembly, comprising a cylindrical diesel particulate filter disposed on a flow passage through which an exhaust gas from an engine is discharged, having gas flow passages formed by dividing an inner space into a lattice form, and configured to capture particulate matters contained in the exhaust gas in the gas flow passages; and an electrode disposed at at least one of both side surfaces of the filter, the electrode receiving electric power to heat the filter; wherein a plurality of regions resulting from division into a lattice form in the filter have alternately disposed open and closed sections,
the filter assembly having at least two capturing regions formed therein;
a flow passage dividing part disposed at at least one of both side surfaces of the filter assembly, the flow passage dividing part having communicating sections of the exhaust gas formed therein and corresponding to the at least two capturing regions;
at least one opening/closing member disposed on the flow passage dividing part and reciprocated between an opening location at which the communicating sections are opened and a closing location at which the communicating sections are closed; and
a driving unit configured to provide the at least one opening/closing member with a driving force for allowing the communicating sections to be opened and closed selectively by the at least one opening/closing member.

2. The device for reducing an exhaust gas of claim 1, further comprising: a power supply configured to supply electric power to the filter assembly;
a plurality of electrodes provided in the at least two capturing regions to apply electric power from the power supply to the at least two capturing regions and configured to heat the at least two capturing regions of the filter assembly;
a temperature sensor provided in the filter assembly to sense a temperature of the filter; and
an electronic control unit configured to control the driving unit, which provides the at least one opening/closing member with a driving force, on the basis of the temperature of the filter sensed by the temperature sensor, to allow the communication sections to be opened and closed selectively by the at least one opening/closing member.

3. The device for reducing an exhaust gas of claim 1, further comprising a gas supply unit provided between the engine and the at least one opening/closing member, the gas supply unit being connected to the at least one opening/closing member and rotated according to the rotation of the at least one opening/closing member, and having feeding passages formed therein for a combustion gas, an oxidizing agent, fuel and air or a reducing agent to be supplied into the filter.

4. The device for reducing an exhaust gas of claim 2, wherein the driving unit comprises: a motor configured to generate a driving force; and a drive shaft disposed between the motor and the at least one opening/closing member to transmit the driving force from the motor to the at least one opening/closing member.

5. The device for reducing an exhaust gas of claim 4, wherein the communicating sections are radially disposed at regular angular intervals about a center of the flow passage dividing part.

6. The device for reducing an exhaust gas of claim 4, wherein the communicating sections have the same area in the flow passage dividing part.

7. The device for reducing an exhaust gas of claim 4, wherein the flow passage dividing part comprises:
a first flow passage dividing part having a plurality of first communicating sections formed therein by uniformly dividing the flow passage dividing part radially; and
a second flow passage dividing part having a smaller area than the first flow passage dividing part, concentrically arranged with respect to the first flow passage dividing part, and having a plurality of second communicating sections formed therein by uniformly dividing the flow passage dividing part radially.

8. The device for reducing an exhaust gas of claim 5, wherein an axial line of the drive shaft is extended along a center of the flow passage dividing part, and the at least one opening/closing member is connected to the drive shaft and rotated reciprocally between the opening location and the closing location of the communicating sections.

9. The device for reducing an exhaust gas of claim 6, wherein the drive shaft and the at least one opening/closing member are provided to open and close the communicating sections having the same area using a flap method.

10. The device for reducing an exhaust gas of claim 7, wherein an axial line of the drive shaft is extended along a center of the flow passage dividing part, and the at least one opening/closing member comprises a first opening/closing member connected to the drive shaft and rotated reciprocally to allow the first communicating sections to be opened and closed, and a second opening/closing member connected to the drive shaft and rotated reciprocally to allow the second communicating sections to be opened and closed.

11. The device for reducing an exhaust gas of claim 7, wherein the at least one opening/closing member comprises a first opening/closing member and a second opening/closing member rotated reciprocally to allow the first communicating sections and the second communicating sections to be opened and closed by separate drive shafts.

12. The device for reducing an exhaust gas of claim 2, wherein the flow passage dividing part and the at least one opening/closing member are disposed at both side surfaces of the filter, and the electronic control unit controls the driving unit to allow the at least one opening/closing member disposed at both side surfaces of the filter to be operated according to the driving unit for opening and closing the communicating sections.

13. The device for reducing an exhaust gas of claim 3, wherein the at least one opening/closing member further comprises an ignitor configured to initiate combustion when fuel and air are supplied.

14. The device for reducing an exhaust gas of claim 3, wherein one or more communicating openings whose total area corresponds to 1 to 25% of the at least one opening/closing member are formed on the at least one opening/closing member.

15. The device for reducing an exhaust gas of claim 1, wherein the electrode has a lattice shape to allow the gas flow passages of the filter to communicate with the electrode.

16. The device for reducing an exhaust gas of claim 15, wherein the lattice-shaped electrode corresponds to the lattice-shaped filter and has alternately disposed open sections and closed sections, such that the open sections of the filter communicate with the open sections of the electrode.

17. The device for reducing an exhaust gas of claim 1, wherein the flow passage dividing part is formed of an insulator for insulating the at least two capturing regions from each other.

18. The device for reducing an exhaust gas of claim 1, wherein a plurality of electrodes are provided, and the plurality of electrodes correspond to the at least two capturing regions.

19. The device for reducing an exhaust gas of claim 18, wherein the plurality of electrodes corresponding to the at least two capturing regions are connected to the filter in a state where the plurality of electrodes are oriented parallel to a flow direction of the exhaust gas passing through the filter.

20. The device for reducing an exhaust gas of claim 16, wherein the electrode comprises a pin provided therein and inserted into one of the closed sections of the filter to increase an electrical contact between the electrode and the filter.

21. The device for reducing an exhaust gas of claim 16, wherein the electrode comprises at least one lead wire attached to one of the closed sections of the filter.

22. The device for reducing an exhaust gas of claim 16, wherein the filter is formed of a ceramic material containing silicon carbide (SiC).

23. The device for reducing an exhaust gas of claim 1, wherein the filter is coated with an oxidation catalyst or a reduction catalyst.

* * * * *